United States Patent
Komuro et al.

(10) Patent No.: US 11,673,549 B2
(45) Date of Patent: Jun. 13, 2023

(54) METHOD FOR CONTROLLING VEHICLE, VEHICLE CONTROL DEVICE, AND STORAGE MEDIUM

(71) Applicant: HONDA MOTOR CO., LTD., Tokyo (JP)

(72) Inventors: Misa Komuro, Wako (JP); Yosuke Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 17/198,420

(22) Filed: Mar. 11, 2021

(65) Prior Publication Data

US 2021/0291829 A1   Sep. 23, 2021

(30) Foreign Application Priority Data

Mar. 18, 2020 (JP) .............................. JP2020-048333

(51) Int. Cl.
*B60W 30/095* (2012.01)
*B60W 10/04* (2006.01)
*B60W 10/20* (2006.01)
*G06V 10/25* (2022.01)
*G06V 20/58* (2022.01)

(52) U.S. Cl.
CPC ........ *B60W 30/0956* (2013.01); *B60W 10/04* (2013.01); *B60W 10/20* (2013.01); *G06V 10/25* (2022.01); *G06V 20/58* (2022.01); *B60W 2554/00* (2020.02); *B60W 2554/4029* (2020.02);
(Continued)

(58) Field of Classification Search
CPC .. B60W 30/0956; B60W 10/04; B60W 10/20; B60W 2554/00; B60W 2554/4029; B60W 2555/20; B60W 2710/20; B60W 2720/10; B60W 40/02; B60W 30/08; B60W 60/0011; G06V 10/40; G06V 20/58; G06V 40/10; G06V 10/25; G08G 1/166
See application file for complete search history.

(56) References Cited

U.S. PATENT DOCUMENTS

| 10,395,114 B1* | 8/2019 | Freeston | ................... G06T 7/70 |
| 2019/0205609 A1* | 7/2019 | Taveira | ................ G08G 5/0069 |

(Continued)

FOREIGN PATENT DOCUMENTS

| DE | 102020207838 A1 * | 12/2021 |
| EP | 3216335 A1 * | 9/2017 |

(Continued)

OTHER PUBLICATIONS

EP 3216335 A1 Translation (Year: 2017).*
(Continued)

*Primary Examiner* — Frederick M Brushaber
(74) *Attorney, Agent, or Firm* — Amin, Turocy & Watson, LLP

(57) ABSTRACT

A method for controlling a vehicle including specifying an object, an attribute of the object, and the strength and direction of wind influencing the object based on an image captured by an imager imaging the surroundings of a vehicle, setting a risk region for the object based on the attribute of the object and the strength and the direction of the wind that are specified, and controlling a speed and steering of the vehicle based on the risk region set by the setter.

8 Claims, 11 Drawing Sheets

(52) U.S. Cl.
CPC ..... *B60W 2555/20* (2020.02); *B60W 2710/20* (2013.01); *B60W 2720/10* (2013.01)

(56) References Cited

U.S. PATENT DOCUMENTS

| | | | | |
|---|---|---|---|---|
| 2019/0206268 A1* | 7/2019 | Taveira | ............... | G08G 5/045 |
| 2019/0238859 A1* | 8/2019 | Yonezawa | ............ | H04N 19/167 |
| 2020/0017049 A1* | 1/2020 | Kobayashi | ............ | B60W 30/08 |
| 2020/0310467 A1* | 10/2020 | Birkedahl | ............... | G01S 13/86 |
| 2022/0097713 A1* | 3/2022 | Neubecker | ............ | B60W 40/02 |

FOREIGN PATENT DOCUMENTS

| | | | | |
|---|---|---|---|---|
| JP | 2000259700 A | * | 9/2000 | |
| JP | 2018-091794 | | 6/2018 | |
| JP | 2018-205909 | | 12/2018 | |
| WO | WO-2019114662 A1 | * | 6/2019 | .............. B60T 17/18 |
| WO | WO-2020131215 A1 | * | 6/2020 | ........ B60W 30/0956 |

OTHER PUBLICATIONS

JP-2000259700-A Translation (Year: 2000).*
WO-2019114662-A1 Translation (Year: 2019).*
DE-102020207838-A1 Translation (Year: 2021).*

\* cited by examiner

182

| ATTRIBUTE OF OBJECT | RISK REGION |
|---|---|
| ADULT | 01 |
| CHILD | 02 |
| BICYCLE | 03 |
| ORDINARY VEHICLE | 04 |
| TRUCK | 05 |
| ⋮ | ⋮ |

186

| FEATURE (WEIGHT, HEIGHT) | DEGREE OF INFLUENCE | DEGREE OF ADDITION |
|---|---|---|
| 001 | 1 | PLUS X1 |
| 002 | 2 | PLUS X2 |
| 003 | 3 | PLUS X3 |
| 004 | 4 | PLUS X4 |
| 005 | 5 | PLUS X5 |
| ⋮ | ⋮ | ⋮ |

METHOD FOR CONTROLLING VEHICLE, VEHICLE CONTROL DEVICE, AND STORAGE MEDIUM

CROSS-REFERENCE TO RELATED APPLICATION

Priority is claimed on Japanese Patent Application No. 2020-048333, filed Mar. 18, 2020, the content of which is incorporated herein by reference.

BACKGROUND

Field

The present invention relates to a method for controlling a vehicle, a vehicle control device, and a storage medium.

Description of Related Art

In the related art, a travel control device that performs alarming in a case where a strong wind around a traffic sign is estimated is disclosed (Japanese Unexamined Patent Application, First Publication No. 2018-091794 and Japanese Unexamined Patent Application, First Publication No. 2018-205909). The travel control device acquires wind speed information from a weather information database.

However, there is a case where the device cannot perform appropriate control of a vehicle depending on a surroundings situation of the vehicle.

SUMMARY

The present invention has been made in consideration of these circumstances, and an object thereof is to provide a method for controlling a vehicle, a vehicle control device, and a storage medium capable of performing exceptionally appropriate control of a vehicle according to a surroundings situation of the vehicle.

A method for controlling a vehicle, a, vehicle control device and a storage medium related to the present invention employ the following configurations.

(1): According to an aspect of the present invention, the method for controlling a vehicle comprises specifying an object, an attribute of the object, and a strength and a direction of a wind influencing the object based on an image captured by an imager imaging the surroundings of a vehicle; setting a risk region for the object based on the attribute of the object and the strength and the direction of the wind that are specified; and controlling a speed and steering of the vehicle based on the risk region.

(2): In the aspect of the above (1), further comprising: setting a risk region on a lee side of the object in accordance with an influence of the wind.

(3): In the aspect of the above (2), further comprising: setting the risk region on the lee side of the object to become larger or sets a risk potential of the risk region on the lee side to become higher as the influence of the wind on the object becomes greater.

(4): In the aspect of any one of the above (1) to (3), further comprising: acquiring weather information indicating a strength and a direction of a wind in the surroundings of the vehicle, setting the risk region by further taking into consideration the weather information.

(5): In the aspect of any one of the above (1) to (4), further comprising: specifying a degree of influence of the wind on the object based on a feature of the object, and setting the risk region by further taking into consideration the degree of influence.

(6): In the aspect of the above (5), the feature of the object includes one or both of a weight and a size of the object.

(7): In the aspect of any one of the above (1) to (6), further comprising: specifying the strength and the direction of the wind based on a state of any of clothing of the object, hair of the object, a plant around a road, and a falling object around the road included in the image.

(8) According to another aspect of the present invention, a vehicle control device comprises a specifier that is configured to specify an object, an attribute of the object, and a strength and a direction of a wind influencing the object based on an image captured by an imager imaging the surroundings of a vehicle; a setter that is configured to set a risk region for the object based on the attribute of the object and the strength and the direction of the wind that are specified by the specifier; and a controller that is configured to control a speed and steering of the vehicle based on the risk region set by the setter.

(9) According to still another aspect of the present invention, there is provided a non-transitory computer readable storage medium that store a program to be executed by a computer to perform at least: specify an object, an attribute of the object, and a strength and a direction of a wind influencing the object based on an image captured by an imager imaging the surroundings of a vehicle; set a risk region for the object based on the attribute of the object and the strength and the direction of the wind that are specified; and control a speed and steering of the vehicle based on the set risk region.

According to the above (1) to (8), the method for controlling a vehicle, the vehicle control device, or the vehicle control device sets a risk region for an object based on an attribute of the object and a strength and a direction of a wind that are specified by the specifier, controls a speed and steering of a vehicle based on the set risk region, and can thus perform more appropriate control of the vehicle according to a surroundings situation. The vehicle control device can more quickly and easily specify a strength and a direction of a wind by using an image.

According to the above (4), the method for controlling a vehicle can set a more appropriate risk region in accordance with an environment by further taking into consideration weather information.

According to the above (5) or (6), the method for controlling a vehicle can set a more appropriate risk region in accordance with the influence of an object and a wind by further taking into consideration a feature of the object.

DETAILED DESCRIPTION

Hereinafter, with reference to the drawings, a method for controlling a vehicle, a vehicle control device, and a storage medium according to embodiments of the present invention will be described.

[Overall Configuration]

Figure 1:
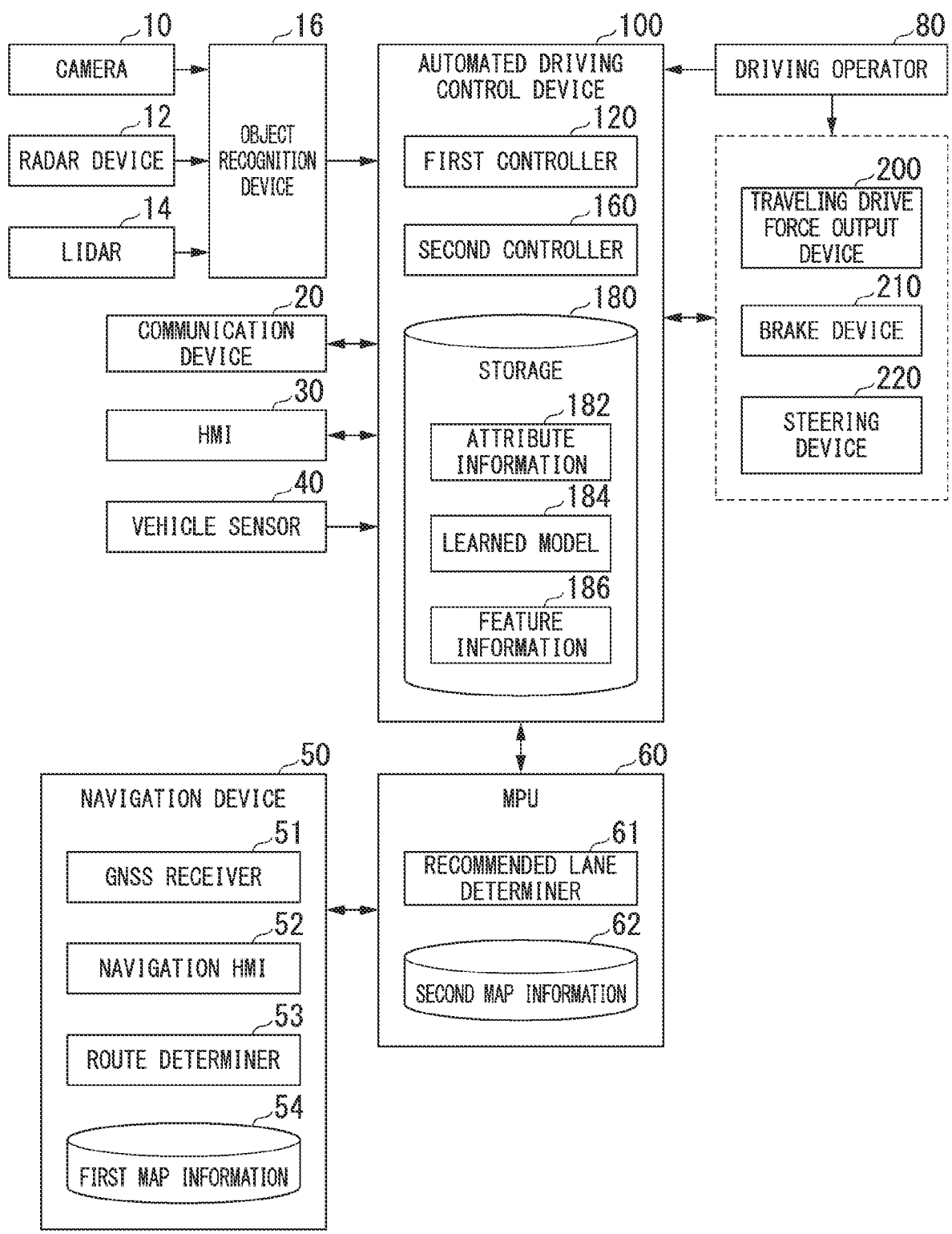
FIG. 1 is a configuration diagram of a vehicle system using a vehicle control device according to an embodiment.

FIG. 1 is a diagram showing a configuration of a vehicle system 1 using a vehicle control device according to an embodiment. A vehicle having the vehicle system 1 mounted therein is, for example, a two-wheeled, three-wheeled, or four-wheeled vehicle, and a drive source thereof is an internal combustion engine such as a diesel engine or a gasoline engine, a motor, or a combination thereof. The motor is operated by using power generated by a generator connected to the internal combustion engine or power released from a secondary battery or a fuel cell.

The vehicle system 1 includes, for example, a camera 10, a radar device 12, light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. The devices and the apparatuses are connected to each other via a multiplex communication line such as a controller area network (CAN) communication line, a serial communication line, or a wireless communication network. The configuration shown in FIG. 1 is only an example, some of the constituents may be omitted, and other constituents may be added.

The camera 10 is a digital camera using a solid-state imaging element such as a charge coupled device (CCD) or a complementary metal oxide semiconductor (CMOS). The camera 10 is attached at any location in a vehicle (hereinafter, an own vehicle M) in which the vehicle system 1 is mounted. In a case where the front side is imaged, the camera 10 is attached to the upper part of a front windshield, the back surface of a rearview mirror, or the like. For example, the camera 10 periodically and repeatedly images the surroundings of the own vehicle M. The camera 10 may be a stereo camera.

The radar device 12 radiates electric waves such as millimeter waves in the surroundings of the own vehicle M, detects electric waves (reflected waves) reflected by an object, and thus detects at least a position of (a distance to and an azimuth of) the object. The radar device 12 is attached at any location in the own vehicle M. The radar device 12 may detect a position and a speed of an object according to a frequency modulated continuous wave (FM-CW) method.

The LIDAR 14 applies light (or an electromagnetic wave with a wavelength close to that of the light) in the surroundings of the own vehicle M, and measures scattered light. The LIDAR 14 detects a distance to a target on the basis of a time from light emission to light reception. The applied light is, for example, pulsed laser light. The LIDAR 14 is attached at any location in the own vehicle M.

The object recognition device 16 performs a sensor fusion process on detection results from some or all of the camera 10, the radar device 12, and the LIDAR 14, and thus recognizes a position, the type (attribute), a speed, and the like of an object. The object recognition device 16 outputs a recognition result to the automated driving control device 100. The object recognition device 16 may output detection results from the camera 10, the radar device 12, and the LIDAR 14 to the automated driving control device 100 without change. The object recognition device 16 may be omitted from the vehicle system 1.

The communication device 20 performs communication with another vehicle present in the surroundings of the own vehicle M, or performs communication with various server apparatuses via a wireless base station by using, for example, a cellular network, a Wi-Fi network, Bluetooth (registered trademark), or dedicated short range communication (DSRC).

The HMI 30 presents various pieces of information to an occupant of the own vehicle M, and also receives an input operation from the occupant. The HMI 30 includes various display devices, a speaker, a buzzer, a touch panel, switches, keys, and the like.

The vehicle sensor 40 includes, for example, a vehicle speed sensor detecting a speed of the own vehicle M, an acceleration sensor detecting acceleration, a yaw rate sensor detecting an angular speed about a vertical axis, and an azimuth sensor detecting an orientation of the own vehicle M.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the own vehicle M on the basis of a signal received from a GNSS satellite. A position of the own vehicle M may be identified or complemented by an inertial navigation system (INS) using an output from the vehicle sensor 40. The navigation HMI 52 includes a display device, a speaker, a touch panel, keys, and the like. The navigation HMI 52 may be partially or entirely integrated into the HMI 30 described above. The route determiner 53 determines, for example, a route (hereinafter, a route on a map) from a position of the own vehicle M identified by the GNSS receiver 51 (or any entered position) to a destination that is entered by an occupant by using the navigation HMI 52 on the basis of the first map information 54. The first map information 54 is, for example, information in which a road shape is expressed by a link indicating a road and nodes connected to each other via the link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, by a function of a terminal apparatus such as a smartphone or a tablet terminal carried by the occupant. The navigation device 50 may transmit the current position and the destination to a navigation server via the communication device 20, and may acquire a route equivalent to the route on the map from the navigation server.

The MPU 60 includes, for example, a recommended lane determiner 61, and stores second map information 62 in a storage device such as an HDD or a flash memory. The recommended lane determiner 61 divides the route on the map provided from the navigation device 50 into a plurality of blocks (for example, divides the route on the map every 100 m in a vehicle advancing direction), and determines a recommended lane for each block by referring to the second map information 62. The recommended lane determiner 61 determines in which lane from the left the own vehicle will travel. When there is a branch location on the route on the map, the recommended lane determiner 61 determines a recommended lane such that the own vehicle M can travel on a reasonable route to advance to a branch destination.

The second map information 62 is map information with higher accuracy than that of the first map information 54. The second map information 62 includes, for example, lane center information or lane boundary information. The second map information 62 may include road information, traffic regulation information, address information (address/postal code), facility information, telephone number information, and the like. The second map information 62 may be updated at any time by the communication device 20 performing communication with other devices.

The driving operator 80 includes, for example, an accelerator pedal, a brake pedal, a shift lever, a steering wheel, an odd-shaped steering wheel, a joystick, and other operators. The driving operator 80 is attached with a sensor detecting an operation amount or whether or not an operation is performed, and a detection result thereof is output to the automated driving control device 100 or some or all of the traveling drive force output device 200, the brake device 210, and the steering device 220.

The automated driving control device 100 includes, for example, a first controller 120, a second controller 160, and a storage 180. Each of the first controller 120 and the second controller 160 is realized, for example, by a hardware processor such as a central processing unit (CPU) executing a program (software). Some or all of the constituents may be realized by hardware (a circuit portion; including a circuitry) such as a large scale integration (LSI), an application specific integrated circuit (ASIC), a field-programmable gate array (FPGA), or a graphics processing unit (GPU), and may be realized by software and hardware in cooperation. The program may be stored in advance in a storage device (a storage device provided with a non-transitory storage medium) such as an HDD or a flash memory of the automated driving control device 100, and may be stored in an attachable and detachable storage medium (non-transitory storage medium) such as a DVD or a CD-ROM and may be installed in the HDD or the flash memory of the automated driving control device 100 when the storage medium is attached to a drive device. The automated driving control device 100 is an example of a "vehicle control device".

The storage 180 is implemented by, for example, an HDD, a flash memory, an electrically erasable programmable read only memory (EEPROM), a read only memory (ROM), or a random access memory (RAM). The storage 180 stores, for example, attribute information 182, a learned model 184, and feature information 186. Details of the information will be described later.

Figure 2:
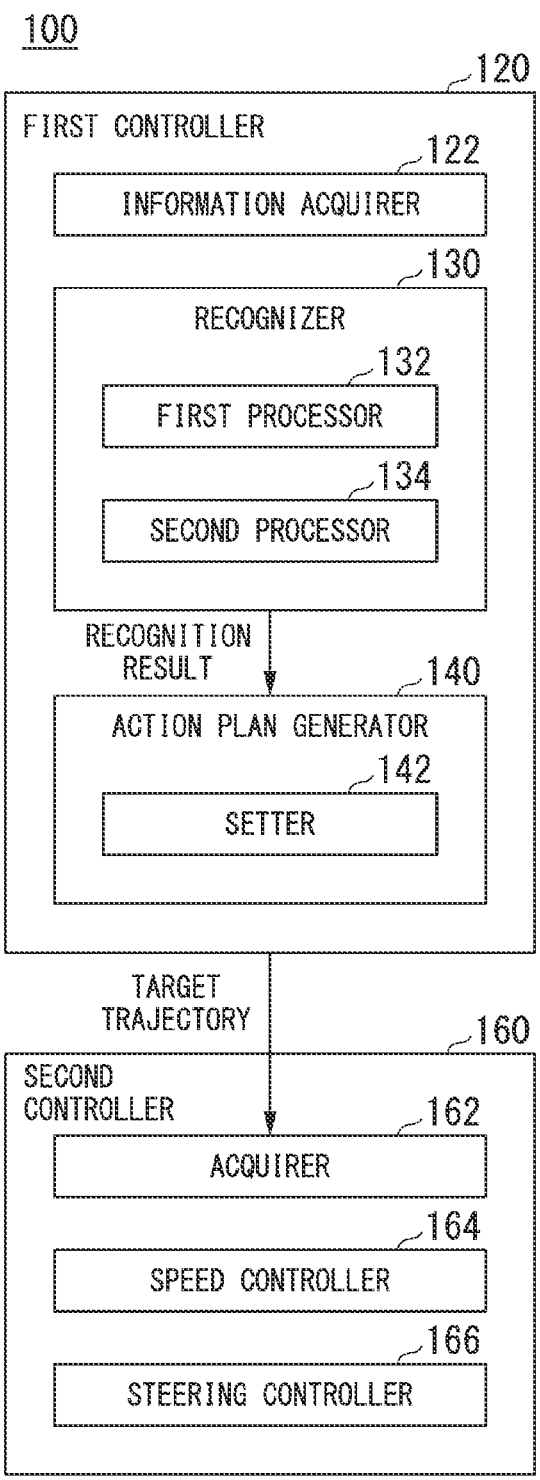
FIG. 2 is a diagram showing functional configurations of a first controller and a second controller.

FIG. 2 is a diagram showing functional configurations of the first controller 120 and the second controller 160. The first controller 120 includes, for example, an information acquirer 122, a recognizer 130, and an action plan generator 140.

The first controller 120 is realized by combining, for example, a function of artificial intelligence (AI) with a function of a model provided in advance. For example, a function of "recognizing an intersection" may be realized by executing recognition of the intersection using deep learning and recognition based on conditions (for example, there are a signal that can be matched with a pattern, and a road marking) given in advance in parallel, and scoring and comprehensively evaluating both of recognition results. Consequently, the reliability of automated driving is ensured.

The information acquirer 122 acquires weather information indicating a strength and a direction of a wind in the surroundings of the own vehicle M. The information acquirer 122 acquires weather information in the surroundings of the vehicle M from a weather information providing server apparatus (not shown) via the communication device 20. The weather information includes a strength (wind speed) and a direction of a wind.

The recognizer 130 recognizes the states of an object, such as the position, the speed, and the acceleration in the surroundings of the own vehicle M on the basis of information that is input from the camera 10, the radar device 12, and the LIDAR 14 via the object recognition device 16. The position of the object is recognized as, for example, a position in an absolute coordinate system having a representative point (for example, the centroid or the drive axis center) of the own vehicle M as an origin, and is used for control. The position of the object may be represented by a representative point such as the centroid or a corner of the object, and may be represented by an expressed region. The "states" of the object may include an acceleration, a jerk, or an "action state" of the object (for example, the object is trying to change lanes or whether or not the object is trying to change lanes).

The recognizer 130 recognizes, for example, a lane (traveling lane) in which the own vehicle M is traveling. For example, the recognizer 130 compares a pattern (for example, an arrangement of solid lines and dashed lines) of road lane markings obtained from the second map information 62 with a pattern of road lane markings in the surroundings of the own vehicle M recognized an image captured by the camera 10, and thus recognizes the traveling lane. The recognizer 130 is not limited to a road lane marking, and may recognize an object representing a lane boundary (road boundary) such as a road lane marking, a road shoulder, a curb, a median strip, and a guardrail, to recognize the traveling lane. In this recognition, a position of the own vehicle M acquired from the navigation device 50 or a process result from an INS may be taken into consideration. The recognizer 130 recognizes a temporary stop line, an obstacle, a red light, a tollgate, or other road events.

When the traveling lane is recognized, the recognizer 130 recognizes the position or the posture of the own vehicle M with respect to the traveling lane. The recognizer 130 may recognize, for example, the deviation of a reference point of the own vehicle M from the lane center and an angle formed with a line connecting the lane centers in an advancing direction of the own vehicle M as a relative position and a posture of the own vehicle M with respect to the traveling lane. Alternatively, the recognizer 130 may recognize a position or the like of the reference point of the own vehicle M with respect to either of side ends (road lane markings or road boundaries) of the traveling lane as the relative position of the own vehicle M with respect to the traveling lane.

The recognizer 130 includes, for example, a first processor 132 and a second processor 134. The first processor 132 acquires the position, an attribute, and the movement direction of an object recognized by the object recognition device 16. The first processor 132 may recognize an object on the basis of an image captured by an imager that images the surroundings of the own vehicle M, and may specify (estimate) the position, attribute, and the movement direction of the recognized object. The second processor 134 specifies (estimates) the strength and direction of wind influencing the object on the basis of an image captured by an imager that images the surroundings of the own vehicle M. Details of this process will be described later.

The action plan generator 140 generates target trajectories in which the own vehicle M automatedly (regardless of an operation of a driver) travels in the future such that the own vehicle M can travel in a recommended lane determined by the recommended lane determiner 61 in principle and can also cope with a surroundings situation of the own vehicle M. The target trajectory includes, for example, a speed element. For example, the target trajectory is expressed by sequentially arranging locations (trajectory points) to be reached by the own vehicle M. The trajectory points are locations to be reached by the own vehicle M every predetermined traveling distance (for example, about several [m]) in terms of a distance along a road, and, separately therefrom, a target speed and a target acceleration for each predetermined sampling time (for example, any of about 0.1 to 0.9 seconds) are generated as parts of the target trajectory. A trajectory point may be a position to be reached by the own vehicle M at a sampling time point every predetermined sampling time. In this case, information regarding the target speed or the target acceleration may be expressed by an interval between trajectory points.

The action plan generator 140 may set an automated driving event when generating the target trajectory. The automated driving event includes, for example, a constant speed traveling event, a low speed following traveling event, a lane change event, a branch event, a merging event, and a takeover event. The action plan generator 140 generates a target trajectory corresponding to a started event.

The action plan generator 140 includes a setter 142. The setter 142 sets a risk region for an object on the basis of an attribute of the object estimated by the first processor 132, and the strength and direction of wind.

The "risk region" is a region in which a risk potential is set. The "risk potential" is an index value indicating a height of a risk in a case where the vehicle M enters a region in which the risk potential is set. The risk region is a region in which the risk potential that is an index value (exceeding zero) with a predetermined magnitude is set. The "object" is an object that may influence traveling of the vehicle M, and includes various moving objects such as a vehicle, a pedestrian, a motorcycle, and an obstacle.

The second controller 160 controls the traveling drive force output device 200, the brake device 210, and the steering device 220 such that the own vehicle M can pass along the target trajectory generated by the action plan generator 140 as scheduled.

Referring to FIG. 2 again, the second controller 160 includes, for example, an acquirer 162, a speed controller 164, and a steering controller 166. The acquirer 162 acquires information regarding the target trajectory (trajectory point) generated by the action plan generator 140, and stores the information in a memory (not shown). The speed controller 164 controls the traveling drive force output device 200 or the brake device 210 on the basis of a speed element included in the target trajectory stored in the memory. The steering controller 166 controls the steering device 220 according to a curved state of the target trajectory stored in the memory. Processes in the speed controller 164 and the steering controller 166 are realized by a combination of, for example, feedforward control and feedback control. As an example, the steering controller 166 executes a combination of feedforward control based on a curvature of a road in front of the own vehicle M and feedback control based on deviation from the target trajectory.

The traveling drive force output device 200 outputs traveling drive force (torque) for traveling of the vehicle to drive wheels. The traveling drive force output device 200 includes, for example, a combination of an internal combustion engine, a motor, and a transmission, and an electronic control unit (ECU) controlling the constituents. The ECU controls the constituents according to information that is input from the second controller 160 or information that is input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information being input from the second controller 160 or information being input from the driving operator 80, so that brake torque corresponding to a braking operation is output to each vehicle wheel. The brake device 210 may include a mechanism, as a backup, transmitting hydraulic pressure generated by operating the brake pedal included in the driving operator 80, to the cylinder via a master cylinder. The brake device 210 is not limited to the above description, and may be an electronic control type hydraulic brake device that controls an actuator according to information being input from the second controller 160 and thus transmits hydraulic pressure in a master cylinder to the cylinder.

The steering device 220 includes, for example, a steering ECU and an electric motor. The electric motor changes an orientation of a turning wheel by applying force to, for example, a rack-and-pinion mechanism. The steering ECU drives the electric motor on the basis of information being input from the second controller 160 or information being input from the driving operator 80, so that an orientation of the turning wheel is changed.

[Process of Setting Risk Region]

The setter 142 sets a risk region for an object on the basis of attributes of the object and the strength and direction of wind. The setter 142 sets the risk region on the basis of the strength (for example, a wind speed) or direction of wind estimated to influence an object such as the clothing of a pedestrian, the hair of a pedestrian, the plants around a road, or a plastic bag on a road. Hereinafter, this process will be described.

(Process of Generating Risk Region on the Basis of Attribute of Object)

Figures 3, 4:
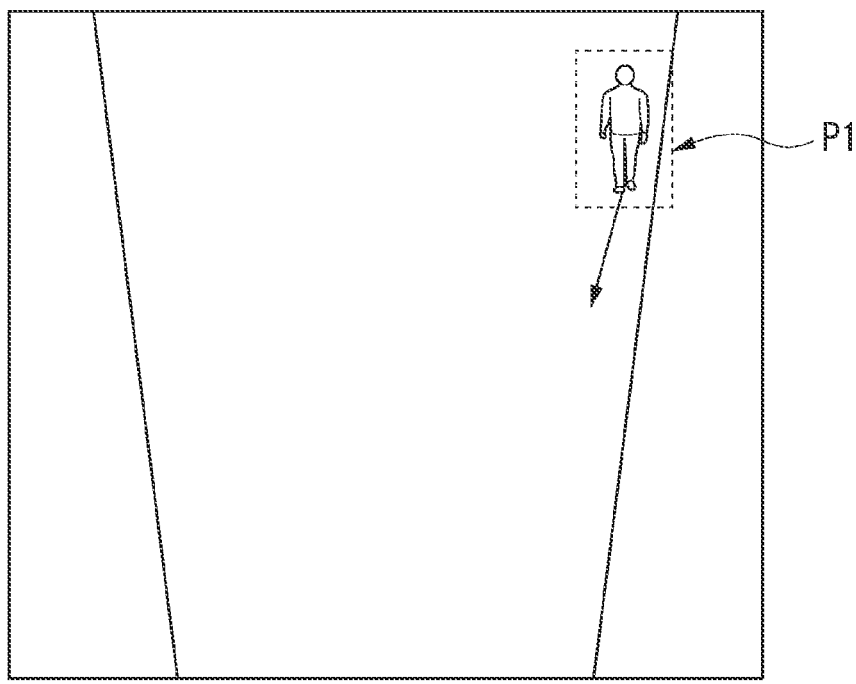
FIG. 3 is a diagram showing an example of an object recognized on the basis of an image.
FIG. 4 is a diagram showing an example of a content of attribute information.

The setter 142 sets a risk region for an object on the basis of an attribute of the object. FIG. 3 is a diagram showing an example of an object recognized on the basis of an image. The first processor 132 acquires a position of an object specified by the object recognition device 16, and an orientation (a movement direction of the object) and an attribute of the object. For example, in the example shown in FIG. 3, the first processor 132 specifies that a pedestrian is present at a position P1, and the pedestrian is heading forward (an arrow direction in FIG. 3).

The setter 142 refers to the attribute information 182, and generates a risk region to be set for the pedestrian on the basis of the position and the attribute of the object provided from the first processor 132. FIG. 4 is a diagram showing an example of a content of the attribute information 182. The attribute information 182 is information in which a risk region is associated with an attribute of an object. In the example shown in FIG. 4, the attribute of the object includes an adult, a child, a bicycle, an ordinary vehicle, a truck, and the like. The risk region is a risk region corresponding to an associated attribute in the attribute information 182. For example, a larger risk region is associated with an object having an attribute that is estimated to have a large movement amount per unit time and to have a higher degree of being watched than others. The risk region associated with the attribute of an object takes into consideration a direction in which the object is advancing. For example, a risk region in a direction in which an object is advancing is set to be larger than a risk region in a direction opposite to the advancing direction.

(Process (First) of Estimating Strength and Direction of Wind Influencing Object)

The first processor 132 estimates the strength and direction of wind influencing an object on the basis of an image provided from the object recognition device 16. The first processor 132 inputs, for example, an image to the learned model 184, and acquires the strength and direction of wind included in results output from the learned model 184. Consequently, the first processor 132 estimates the strength and direction of wind influencing an object.

Figure 5:
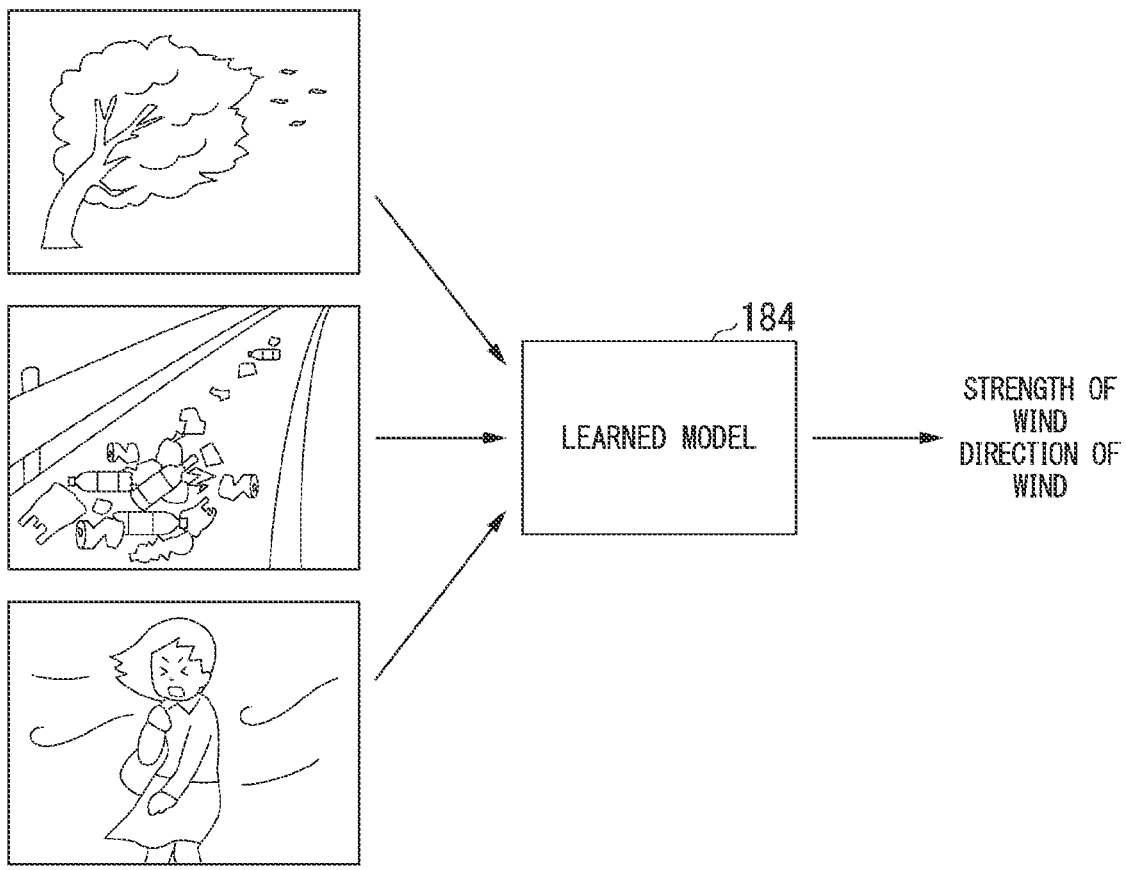
FIG. 5 is a diagram showing examples of an image that is input to a learned model and information that is output from the learned model.

FIG. 5 is a diagram illustrating examples of an image that is input to the learned model 184 and information that is output from the learned model 184. The learned model 184 is a model for which machine learning or a neural network is used. The learned model 184 is a model that is obtained through learning of training data and outputs information regarding the strength and direction of wind when an image is input thereto. The training data is information including an image of a landscape and the strength and direction of the wind actually blowing in an environment of the landscape. When an image of a landscape is input to the learned model 184, the learned model 184 is learned to output information indicating the strength and direction of the wind actually blowing in an environment of the landscape.

For example, when a first image of a landscape in which tree branches are fanned by a wind is input to the learned model 184, the learned model 184 outputs information indicating a strength and a direction of the wind in the landscape. For example, when a second image of a landscape in which tree branches are not fanned by a wind is input to the learned model 184, the learned model 184 outputs information indicating a strength and a direction of the wind in the landscape. The strength of the wind that is output in a case where the first image is input is weaker than the strength of the wind that is output in a case where, for example, the second image is input.

When a third image to a sixth image are input to the learned model 184, the learned model 184 outputs information indicating strengths and directions of winds in environments of landscapes in the images. The strength of the wind that is output in a case where the third image is input is weaker than the strength of the wind that is output in a case where, for example, the fourth image is input. The third image is an image of a landscape in which trash has accumulated on one side of a road. The fourth image is an image of a landscape in which trash has not accumulated on one side of a road.

The strength of the wind that is output in a case where the fifth image is input is weaker than the strength of the wind that is output in a case where, for example, the sixth image is input. The fifth image is an image of a landscape in which the hair of a pedestrian is fluttering. The sixth image is an image of a landscape in which the hair of a pedestrian is not fluttering.

When time-series data is input, the learned model 184 may be a model that outputs an output result corresponding to the time-series data. For example, the learned model 184 is such as a recurrent neural network (RNN). In this case, training data is information including an image of a landscape captured in each time series and the strength and direction of wind actually blowing in an environment of the landscape.

Figure 6:
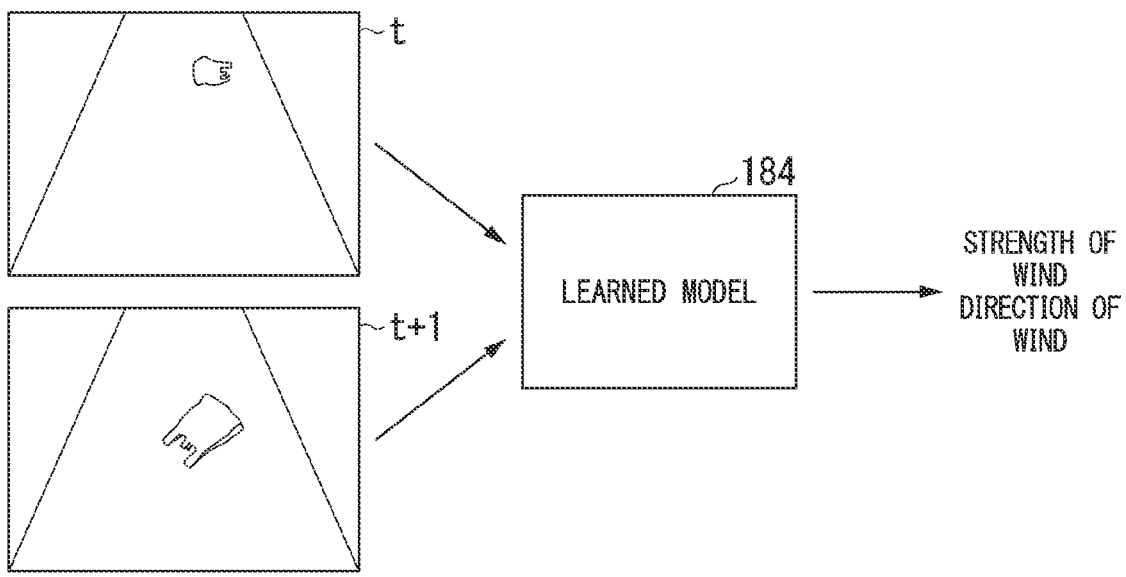
FIG. 6 is a diagram showing examples of time-series data that is input to the learned model and information that is output from the learned model.

FIG. 6 is a diagram illustrating examples of time-series data that is input to the learned model 184 and information that is output from the learned model 184. For example, a seventh image captured at time point t is input to the learned model 184, an eighth image captured at time point t+1 is further input to the learned model 184, and then the learned model 184 outputs information indicating a strength and a direction of a wind. The seventh image is an image in which a plastic bag has fallen at a predetermined position on a road. The eighth image is an image captured when the plastic bag has moved to a position in front of the predetermined position on the road due to wind. When the seventh image and the eighth image are input to the learned model 184, the learned model 184 outputs a strength and a direction of the wind.

As described above, the first processor 132 estimates (specifies) the strength and direction of the wind influencing an object on the basis of an image provided from the object recognition device 16.

The process in which the first processor 132 estimates the strength and direction of the wind by using the learned model 184 is an example of a process of "estimating the strength and direction of the wind on the basis of a state (the degree of change) of any of clothing of a person, the hair of a person, a plant around a road, and a falling object around a road included in an image". In a learning stage of the learned model 184, a state of any of clothing of a person, the hair of a person, a plant around a road, and a falling object around a road included in an image and correct answer data indicating the strength and direction of wind in each state are used as training data and are learned. The learned model 184 outputs information indicating the strength and direction of the wind on the basis of a state of any of clothing of a person . . . , and a falling object included in an image.

The first processor 132 may estimate the strength and direction of the wind according to a change in a state of a target object in time-series images. For example, as shown in FIG. 6 described above, the first processor 132 may estimate the strength and direction of the wind blowing toward an object on the basis of a change in a position of the plastic bag in the time-series images and information indicating the strength and the direction of the wind associated with the change. For example, the first processor 132 may refer to information in which an attribute of an object, a change pattern of the object, and the strength and direction of the wind are associated with each other to estimate the strength and the direction of the wind.

(Process (Second) of Estimating Strength and Direction of Wind Influencing Object)

The first processor 132 may estimate the strength and direction of the wind by taking into consideration weather information acquired by the information acquirer 122. For example, the first processor 132 may acquire the strength and direction of the wind by statistically processing the strength and direction of the wind included in weather information in a target environment and the strength and direction of the wind output from the learned model 184 or applying the strengths and the directions of the winds to a predetermined function.

(Process of Estimating Degree of Influence to which Object is Influenced by Wind)

Figures 7, 8:
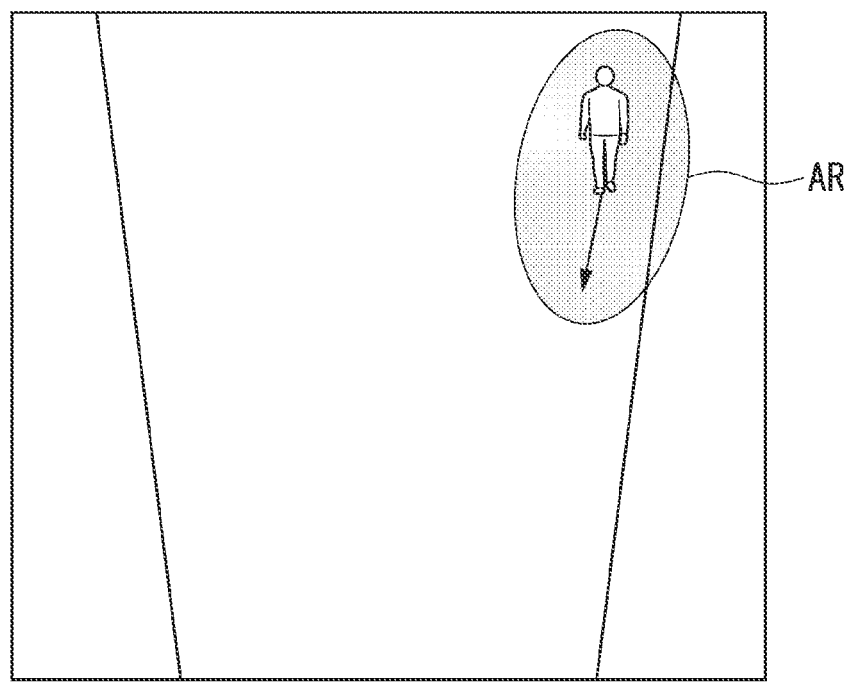
FIG. 7 is a diagram showing an example of a content of feature information.
FIG. 8 is a diagram showing an example of a risk region that is generated on the basis of an attribute of an object.

The second processor 134 estimates the degree of influence to which an object is influenced by a wind on the basis of an image. The second processor 134 estimates the degree of influence by referring to the feature information 186. FIG. 7 is a diagram showing an example of a content of the feature information 186. The feature information 186 is information in which a feature of an object, the degree of influence, and the degree of addition are associated with each other. The features of the object are the height of the object, the size of the object, the area of the object, the weight of the object, or the like. The second processor 134 may estimate a feature of an object on the basis of an image, and may estimate a feature of an object by using a learned model or a method such as pattern matching using a template of the object that is prepared in advance. The learned model 184 is a model that outputs a feature of an object when an image of the object is input thereto.

For example, the feature information 186 defines that, when an object receives a wind, the degree of influence increases as a position of the object tends to change or move due to the influence of the wind. The degree of addition is a size of a risk region added to a risk region according to the degree of influence. For example, the feature information 186 defines that the degree of addition increases as the degree of influence increases.

(Process of Setting Risk Region)

The setter 142 corrects a risk region that is generated on the basis of an attribute of an object, on the basis of the strength and direction of wind and the degree of influence based on a feature of the object, and sets a risk region referred to when an action plan is generated.

FIG. 8 is a diagram showing an example of a risk region generated on the basis of an attribute of an object. The setter 142 generates a risk region AR on the basis of an attribute of an object and an advancing direction of the object.

Figure 9:
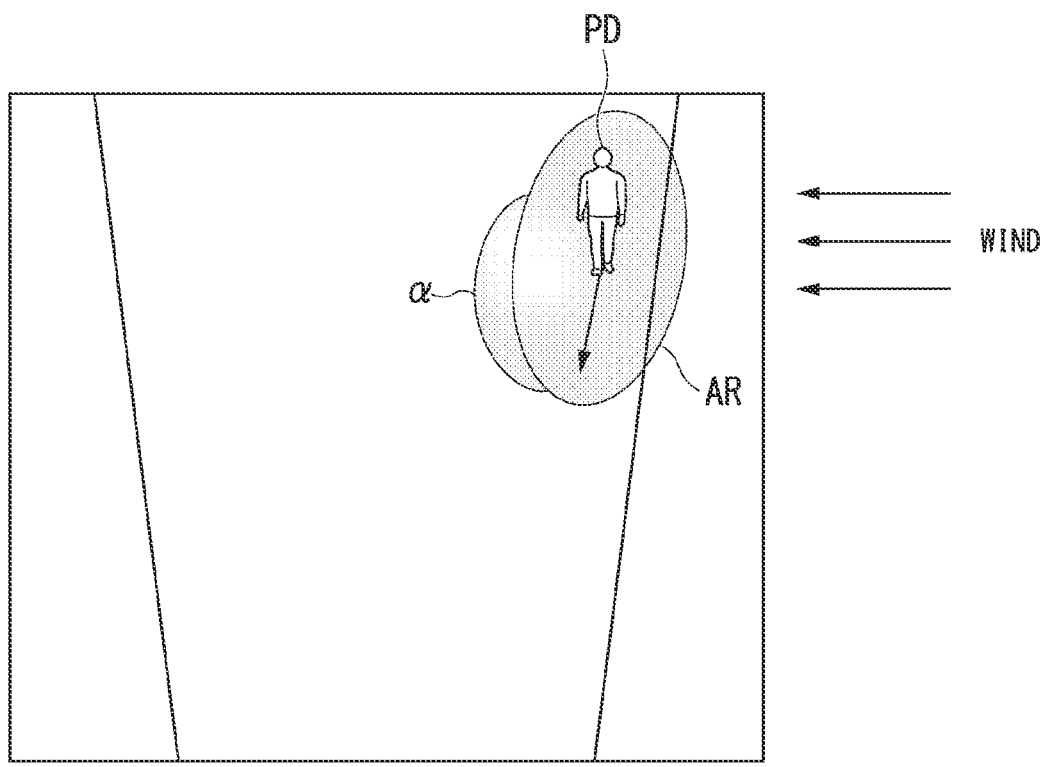
FIG. 9 is a diagram showing an example of a risk region that is set on the basis of a strength and a direction of a wind, and the degree of influence based on a feature of an object.

FIG. 9 is a diagram showing an example of a risk region that is set on the basis of the strength and direction of wind and the degree of influence based on a feature of an object. For example, in a case where a wind is blowing from the left of a pedestrian PD, a risk region is set by adding a risk region α to the risk region AR. The risk region α is a region added to the right side of the pedestrian in the forward direction according to a strength of the wind and a feature of the object.

Figure 10:
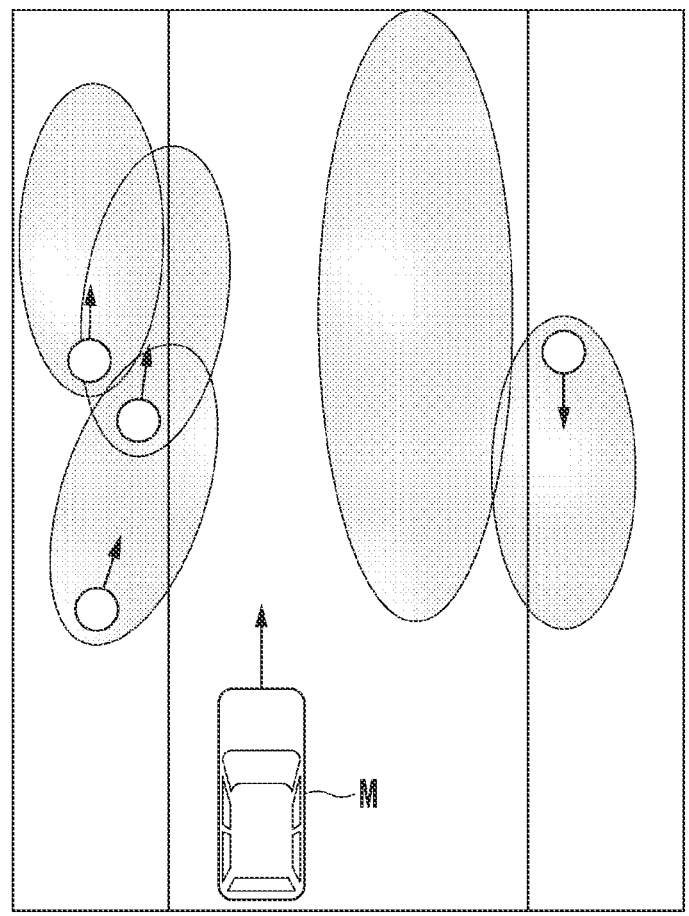
FIG. 10 is a diagram showing an example of a risk region set for each object in a case where a strength and a direction of a wind and a feature of an object are not taken into consideration.

In a case where there are a plurality of objects on a road (roadway and sidewalk), the setter 142 sets a risk region for each of the objects by taking into consideration the strength and direction of the wind and a feature of the object. FIG. 10 is a diagram showing an example of a risk region set for each object in a case where the strength and direction of the wind and a feature of an object are not taken into consideration. In a case of the situation shown in FIG. 10, the vehicle M generates an action plan in which the vehicle M is advancing while avoiding the risk regions.

Figure 11:
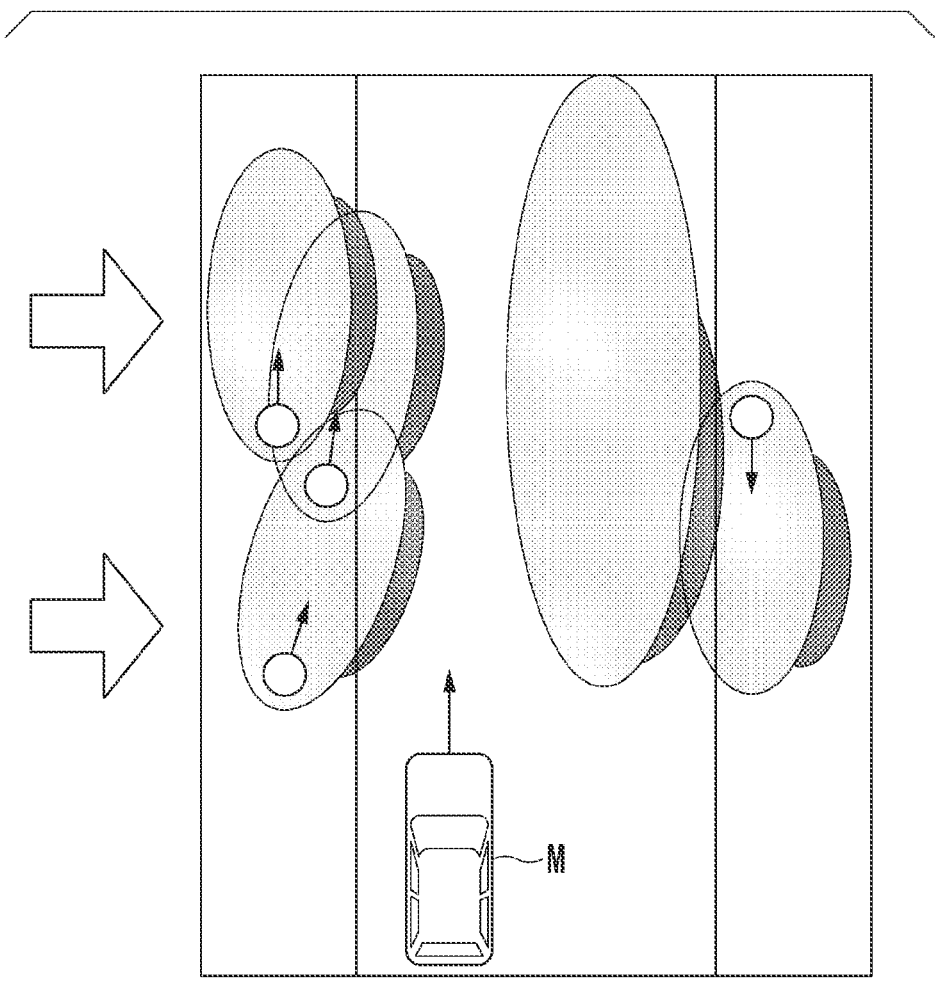
FIG. 11 is a diagram showing an example of a risk region set for each object in a case where a strength and a direction of a wind and a feature of an object are taken into consideration.
Figure 11:
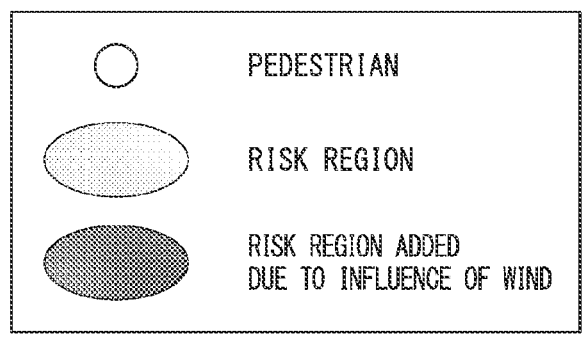

FIG. 11 is a diagram showing an example of a risk region set for each object in a case where the strength and direction of the wind and a feature of an object are taken into consideration. In a case where the wind and the feature are taken into consideration, the risk regions are expanded to leeward. As in the situation shown in FIG. 11, since the risk regions have been expanded, there is no space for the vehicle M to travel while avoiding the risk regions. In this case, the vehicle M stops at a predetermined position not to enter the risk regions.

As described above, the automated driving control device 100 sets a risk region by taking into consideration the influence of a wind or a feature of an object, and can thus set the risk region with high accuracy. The automated driving control device 100 controls the vehicle M on the basis of the set risk region, and can thus realize more appropriate traveling in accordance with a surroundings situation.

[Flowchart]

Figure 12:
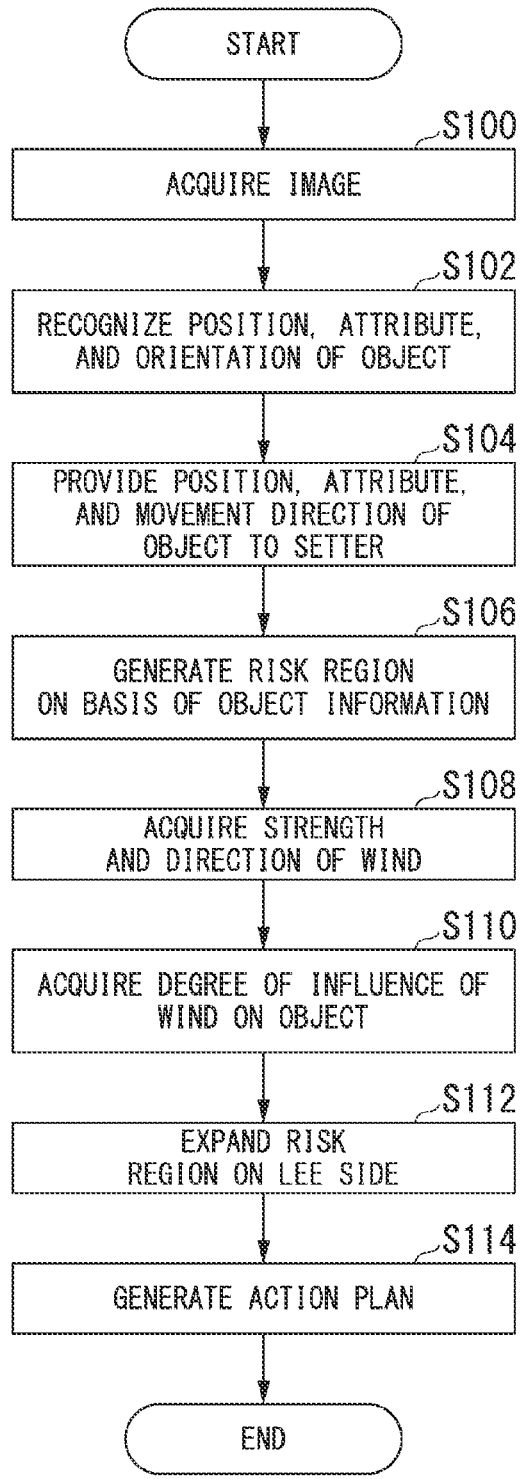
FIG. 12 is a flowchart showing an example of a flow of processes executed by an automated driving control device.

FIG. 12 is a flowchart illustrating an example of a flow of processes executed by the automated driving control device 100. The processes are executed in a predetermined cycle.

First, the object recognition device 16 of the automated driving control device 100 acquires an image captured by the camera 10 (step S100). Next, the object recognition device 16 recognizes a position, an attribute, and an orientation (movement direction) of an object included in the acquired image (step S102). Next, the first processor 132 provides the information (object information) recognized by the object recognition device 16 to the setter 142 (step S104). The setter 142 generates a risk region on the basis of the information (object information) provided in step S104 and the attribute information 182 (step S106).

Next, the second processor 134 acquires the strength and direction of wind on the basis of the image captured by the camera 10 (step S108). In this case, the second processor 134 may take into consideration the strength and the direction of the wind by referring to weather information.

Next, the second processor 134 acquires the degree of influence of the wind received by the object on the basis of the features of the object (step S110). Next, the setter 142 sets a risk region to be expanded to leeward on the basis of the strength of the wind, the direction of the wind, and the degree of influence (step S112).

Next, the action plan generator 140 generates an action plan on the basis of the risk region set in step S112 (step S114). The vehicle M travels or stops on the basis of the generated action plan. Consequently, the processes corresponding to one routine of the flowchart are finished.

According to the above-described first embodiment, the automated driving control device 100 sets a risk region on the basis of an attribute of an object, and a strength and a direction of a wind, controls the vehicle M on the basis of the set risk region, and can thus control the vehicle more according to a surroundings situation.

Second Embodiment

Hereinafter, a second embodiment will be described. In the first embodiment, the setter 142 expands a risk region in accordance with a strength and a direction of a wind. In contrast, in the second embodiment, a risk region is maintained or expanded, and a risk potential in the risk region is changed in accordance with a strength and a direction of a wind. Hereinafter, a description will focus on differences from the first embodiment.

Figure 13:
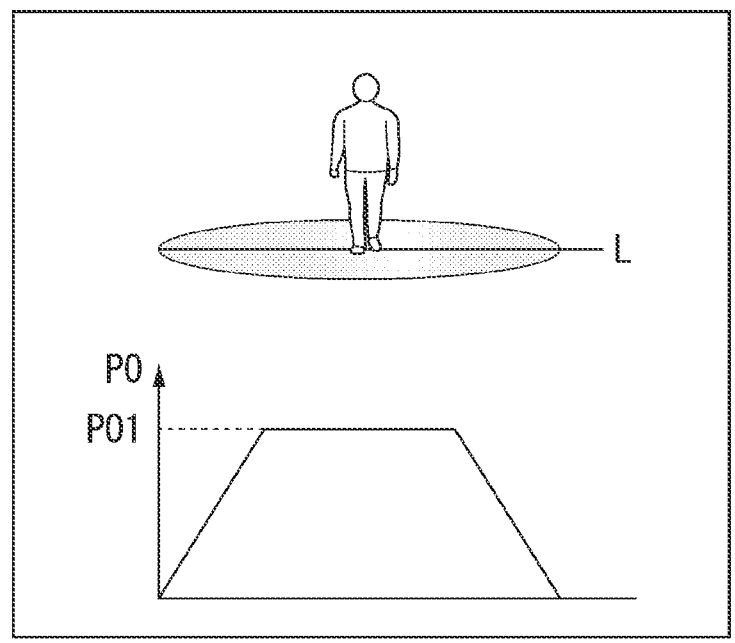
FIG. 13 is a diagram for describing a risk potential in a case where a strength and a direction of a wind are not taken into consideration.

FIG. 13 is a diagram for describing a risk potential in a case where the strength and direction of the wind are not taken into consideration. The example in FIG. 13 shows a risk potential of a region L. The risk potential is a risk potential PO1 in a region within a predetermined distance from the pedestrian PD, and is lower than the risk potential PO1 in a region out of the predetermined distance.

Figure 14:
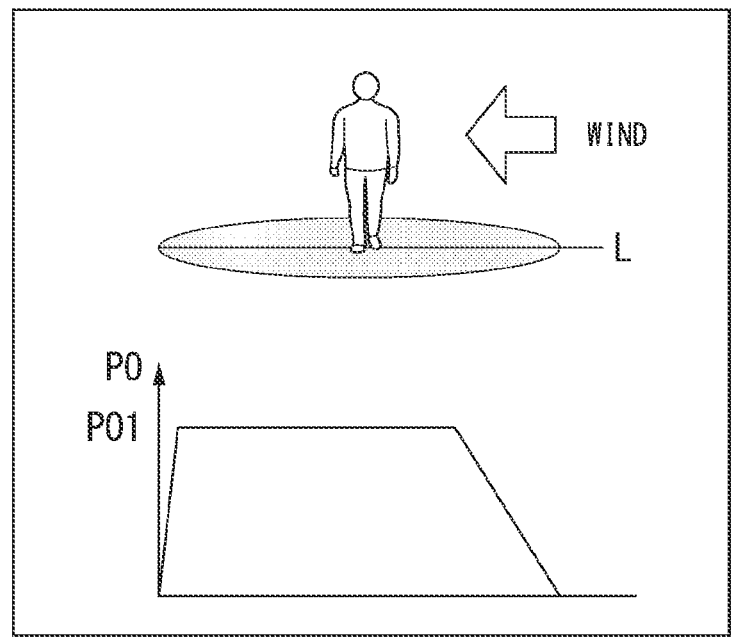
FIG. 14 is a diagram for describing a risk potential in a case where a strength and a direction of a wind are taken into consideration.

FIG. 14 is a diagram for describing a risk potential in a case where a strength and a direction of a wind are taken into consideration. The example in FIG. 14 shows a risk potential of the region L. The risk potential is a risk potential PO1 in a region within a predetermined distance from the pedestrian PD on the lee side, and the risk potential is lower than the risk potential PO1 in a region other than the above region. As described above, the setter 142 sets a risk potential of a risk region on the lee side to be higher than a risk potential in a case where the influence of a wind is not taken into consideration. For example, the vehicle M avoids entering a region of which a risk potential is equal to or more than a threshold value, or slowly enters or carefully enters the region at a predetermined speed or lower in a case where the vehicle M cannot avoid entering the region of which the risk potential is equal to or more than the threshold value.

According to the above-described second embodiment, the setter 142 sets a risk potential of a risk region on the lee side to become higher as the influence of a wind on an object becomes greater, and thus it is possible to achieve the same effect as that of the first embodiment.

[Hardware Configuration]

Figure 15:
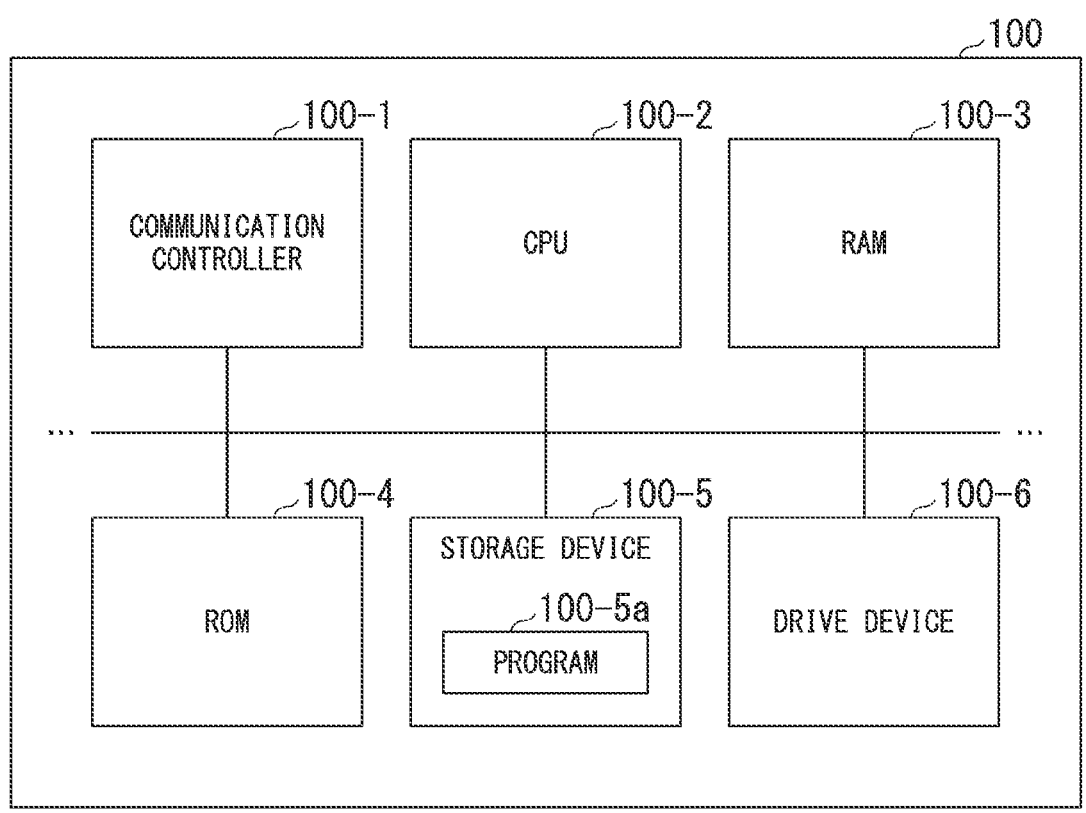
FIG. 15 is a diagram showing an example of a hardware configuration of the automated driving control device of the embodiment.

FIG. 15 is a diagram showing an example of a hardware configuration of the automated driving control device 100 of the embodiment. As shown in FIG. 15, the automated driving control device 100 is configured to include a communication controller 100-1, a CPU 100-2, a random access memory (RAM) 100-3 used as a working memory, a read only memory (ROM) 100-4 storing a boot program or the like, a storage device 100-5 such as a flash memory or a hard disk drive (HDD), and a drive device 100-6 that are connected to each other via an internal bus or a dedicated communication line. The communication controller 100-1 performs communication with constituents other than the automated driving control device 100. The storage device 100-5 stores a program 100-5a executed by the CPU 100-2. The program is loaded to the RAM 100-3 by a direct memory access (DMA) controller (not shown), and is executed by the CPU 100-2. Consequently, the first controller 120, the second controller 160, and some or all of the functions thereof are realized.

The embodiments may be expressed as follows.

A vehicle control device includes a storage device storing a program, and a hardware processor, in which the hardware processor executes the program stored in the storage device, and thus estimates an object, an attribute of the object, and a strength and a direction of a wind influencing the object on the basis of an image captured by an imager imaging the surroundings of a vehicle, sets a risk region for the object on the basis of the estimated attribute of the object and the estimated strength and direction of the wind, and controls a speed and steering of the vehicle on the basis of the set risk region.

As mentioned above, the mode for carrying out the present invention has been described by using the embodiment, but the present invention is not limited to the embodiment, and various modifications and replacements may occur within the scope without departing from the spirit of the present invention.

What is claimed is:

1. A method for controlling a vehicle comprising:
   causing, by a device comprising a processor, an imaging device to capture an image of a surroundings of a vehicle;
   based on the image, specifying, by the device, an object that is a traffic participant present on a road, an attribute of the object, and a strength and a direction of a wind influencing the object;
   based on the attribute of the object, setting, by the device, a first risk region associated with the attribute;
   inputting, by the device, one image captured by the image device to a trained model;
   based on an output from the trained model, identifying, by the device, a strength and a direction of the wind;
   based on the strength and the direction of the wind, setting, by the device, a second risk region for the object, wherein the second risk region represents a region in which the first risk region is expanded leeward; and
   based on the second risk region, controlling, by the device, a speed and steering of the vehicle,
   wherein the one image is an image that captures at least one of clothing of the object, hair of the object, a plant around the road, or a fallen object around the road,
   the trained model is a model that has been trained using a plurality of training data sets, each of the training data sets includes a combination of the one image, the strength of the wind in an environment of the landscape in the one image, and the direction of the wind in the environment of the landscape in the one image, and
   wherein the trained model is the model that has been trained using the plurality of the data sets so that the trained model outputs information indicating the strength and direction of the wind actually blowing in the environment of the landscape in the one image when the one image is input to the trained model.

2. The method for controlling a vehicle according to claim 1, further comprising:
   setting, by the device, a third risk region on a lee side of the object in accordance with an influence of the wind.

3. The method for controlling a vehicle according to claim 2, further comprising:
   setting, by the device, the third risk region on the lee side of the object to become larger or setting a risk potential of the third risk region on the lee side to become higher as the influence of the wind on the object becomes greater.

4. The method for controlling a vehicle according to claim 1, further comprising:
   acquiring, by the device, weather information indicating a strength and a direction of a wind in the surroundings of the vehicle, and
   setting the second risk region by further taking into consideration the weather information.

5. The method for controlling a vehicle according to claim 1, further comprising:
   specifying, by the device, a degree of influence of the wind on the object based on a feature of the object, and setting the second risk region by further taking into consideration the degree of influence.

6. The method for controlling a vehicle according to claim 5, wherein the feature of the object includes one or both of a weight and a size of the object.

7. A vehicle control device comprising:
a processor configured to:
cause an imaging device to capture an image of a surroundings of a vehicle;
based on the image, specify an object that is a traffic participant present on a road, an attribute of the object, and a strength and a direction of a wind influencing the object;
based on the attribute of the object, set a first risk region associated with the attribute;
input one image captured by the image device to a trained model;
based on an output from the trained model, identify a strength and a direction of the wind;
based on the strength and the direction of the wind, set a second risk region for the object, wherein the second risk region represents a region in which the first risk region is expanded leeward; and
based on the second risk region, control a speed and steering of the vehicle,
wherein the one image is an image that captures at least one of clothing of the object, hair of the object, a plant around the road, or a fallen object around the road,
the trained model is a model that has been trained using a plurality of training data sets, each of the training data sets includes a combination of the one image, the strength of the wind in an environment of the landscape in the one image, and the direction of the wind in the environment of the landscape in the one image, and
wherein the trained model is the model that has been trained using the plurality of the data sets so that the trained model outputs information indicating the strength and direction of the wind actually blowing in the environment of the landscape in the one image when the one image is input to the trained model.

8. A non-transitory computer readable storage medium that stores a program to be executed by a computer comprising a processor to perform at least:
cause an imaging device to capture an image of a surroundings of a vehicle;
based on the image, specify an object that is a traffic participant present on a road, an attribute of the object, and a strength and a direction of a wind influencing the object;
based on the attribute of the object, set a first risk region associated with the attribute;
input one image captured by the image device to a trained model;
based on an output from the trained model, identify a strength and a direction of the wind;
based on the strength and the direction of the wind, set a second risk region for the object, wherein the second risk region represents a region in which the first risk region is expanded leeward; and
based on the second risk region, control a speed and steering of the vehicle, wherein
the one image is an image that captures at least one of clothing of the object, hair of the object, a plant around the road, or a fallen object around the road,
the trained model is a model that has been trained using a plurality of training data sets, each of the training data sets includes a combination of the one image, the strength of the wind in an environment of the landscape in the one image, and the direction of the wind in the environment of the landscape in the one image, and
wherein the trained model is the model that has been trained using the plurality of the data sets so that the trained model outputs information indicating the strength and direction of the wind actually blowing in the environment of the landscape in the one image when the one image is input to the trained model.

* * * * *